US012529246B2

(12) United States Patent
Hauskin

(10) Patent No.: US 12,529,246 B2
(45) Date of Patent: Jan. 20, 2026

(54) FRICTION RESISTANT, RETROFITTED, AUTO-RESETTING, DETENTION LATCH LOCK APPARATUS

(71) Applicant: Chad Hauskin, Lafayette, TN (US)

(72) Inventor: Chad Hauskin, Lafayette, TN (US)

( * ) Notice: Subject to any disclaimer, the term of this patent is extended or adjusted under 35 U.S.C. 154(b) by 339 days.

(21) Appl. No.: 18/214,079

(22) Filed: Jun. 26, 2023

(65) Prior Publication Data

US 2024/0052675 A1 Feb. 15, 2024

Related U.S. Application Data

(60) Provisional application No. 63/397,204, filed on Aug. 11, 2022.

(51) Int. Cl.
*E05B 55/12* (2006.01)
*E05B 17/20* (2006.01)

(52) U.S. Cl.
CPC .......... *E05B 55/12* (2013.01); *E05B 17/2092* (2013.01); *E05Y 2800/70* (2013.01); *E05Y 2900/132* (2013.01)

(58) Field of Classification Search
CPC .......... E05B 81/06; E05B 81/16; E05B 63/20; E05B 63/185; E05B 63/12; E05B 63/121; E05B 63/18; E05B 63/0056; E05B 63/202; E05B 55/12; E05B 17/2092; E05B 17/2084; E05B 17/2088; E05B 65/0017; E05B 2063/0082; E05B 2063/0086; E05B 2063/207; E05Y 2800/70
See application file for complete search history.

(56) References Cited

U.S. PATENT DOCUMENTS 5,474,339 A * 12/1995 Johnson .................. E05B 81/16 292/201
5,820,177 A * 10/1998 Moon ..................... E05B 63/20 292/335
2010/0223968 A1* 9/2010 Krueger .................. E05B 81/06 70/283.1
2016/0002961 A1* 1/2016 Graham .............. E05B 17/2084 292/163
2020/0157848 A1* 5/2020 Liu ........................... E05B 9/02

FOREIGN PATENT DOCUMENTS

DE 19609486 C1 * 9/1997 ......... E05B 63/0017
DE 19905596 A1 * 8/2000 ............. E05B 59/00
DE 102018128058 A1 * 5/2019 ............. E05B 15/04
KR 101056922 B1 * 8/2011

* cited by examiner

*Primary Examiner* — Kristina R Fulton
*Assistant Examiner* — Emily G. Brown
(74) *Attorney, Agent, or Firm* — The Rapacke Law Group, P.A.

(57) ABSTRACT

A retrofittable, auto-resetting detention locking apparatus includes a main body defining various features including a mounting hole, pin guide, slide guide, slide track, slide channel, grub screw guide groove, and concave divot. The apparatus further includes a slide that includes first and second plates joined by a rail that slidably interacts with the slide guide. A resistance spring mounted between the main body and slide biases the components together. A security pin fixed to the second plate mechanically engages with door locking mechanisms. The apparatus may be retrofitted to existing access points to prevent tampering with doorway locking mechanisms while providing automatic reset functionality during breach attempts.

16 Claims, 12 Drawing Sheets

FRICTION RESISTANT, RETROFITTED, AUTO-RESETTING, DETENTION LATCH LOCK APPARATUS

CROSS-REFERENCE TO RELATED APPLICATIONS

This application claims the benefit of U.S. Provisional Application Ser. No. 63/397,204 filed on Aug. 11, 2022.

TECHNICAL FIELD

The embodiments generally relate to locking mechanisms.

BACKGROUND

Access points, such as doorways, are commonly locked to prevent unwanted ingress or egress through the doorway. Many locking mechanisms are currently available. However, these devices are prone to breakage. Further, many locking mechanisms may be tampered with in order to breach the access point they are design to secure.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments described herein provide a retrofittable, auto-resetting detention locking apparatus. The locking apparatus may utilize friction as a means of resistance for securing an entryway.

According to some embodiments, the apparatus may include a main body that includes a rail to provide a sliding engagement between the main body and a slide. A resistance spring is mounted between a lower spring mount on the main body and an upper spring mount on the slide to bias the locking apparatus to a closed position to retain an access point in a closed position. A mounting hole permits the mounting of the locking apparatus to an access point. A security pin engages against the detention latch and improves upon the commonly used shear pins in the current technology.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
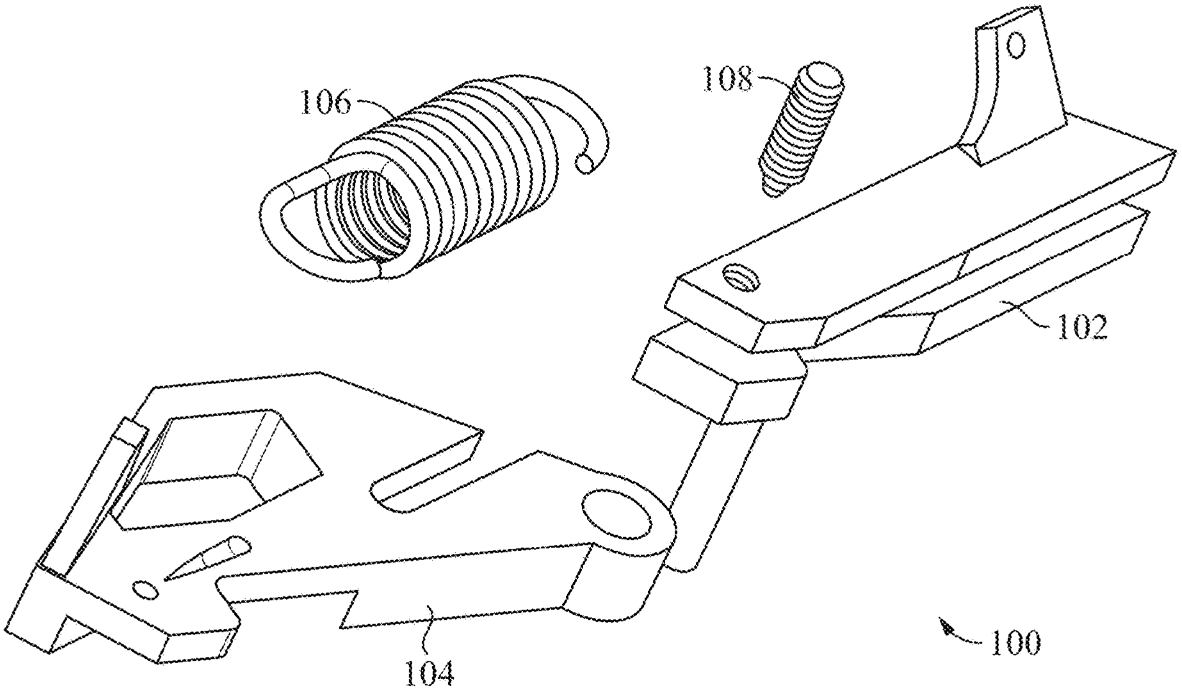
FIG. 1 illustrates an exploded perspective view of the locking apparatus, according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used to distinguish one entity or element from another entity or element without necessarily requiring or implying any physical or logical relationship, or order between such entities or elements.

In general, the embodiments relate to a detention latch locking mechanisms that prevent breaching of locked and secured detention latches. As an added benefit, consumable shear pins may not be required or included. During a common method of detention latches, a roller arm may be forced into an open position by lodging a foreign object between the roller arm and the frame of a secure doorway. Doing so effectively prevents a latch bolt of the same detention latch from securing the door in place, allowing for interference with secured detention latches. According to some embodiments, the disclosed locking apparatus may be retrofitted to an existing access point to prevent such tampering.

In general, a locking apparatus may be implemented in a secure doorway in an open setting while preventing locking of the roller arm into an open position via a foreign object. A secure doorway may include a frame through which a latch bolt and roller arm may pass. The latch bolt may be part of a larger lock assembly which the locking apparatus may secure. The roller arm may include a roller and roller pin which may mechanically interact with a pin guide of the locking mechanism to bias a main body towards the doorway frame via a resistance spring. In use, the latch bolt and roller arm may be forced towards the locking apparatus such that the roller pin mechanically interacts with the pin guide to rotate the locking apparatus such that a security pin passes over the first shoulder of the lock assembly and onto a top face of the lock assembly and into a second shoulder. At the same time, a pin guide may bias the roller pin and roller towards a door, preventing locking of the roller arm into an open position via a foreign object.

A retrofittable, auto-resetting detention locking apparatus may include a main body defining a mounting hole, a pin guide, a slide guide, a slide track, a slide channel, a grub screw guide groove, and a concave divot. The locking apparatus may further include a first spring mount affixed to the main body and defining a first spring mounting hole. The locking apparatus may further include a slide comprising a first plate and a second plate joined by a rail constructed and arranged to slidably interact with slide guide and slidably travel within the slide channel and wherein the slide defines a grub screw guide groove and a concave divot. The locking apparatus may further include a second spring mount affixed to the slide and defining a second spring mounting hole; a resistance spring mounted to the first spring mounting hole and the second spring mounting hole; and a security pin fixed to the second plate.

FIG. 1 illustrates a perspective view of the locking apparatus 100 having a main body 104. The main body 104 defines a mounting hole 105 to mount the locking apparatus 100 to a door system, such as in a penitentiary setting. A slide 102 may be slidably engaged with the main body 104, as will be shown in greater detail. A resistance spring 106 may attach to both the main body 104 and the slide 102 such that the slide and main body may be biased towards one another. A spring-loaded grub screw 108 may threadingly engage with the slide 102.

Figure 2:
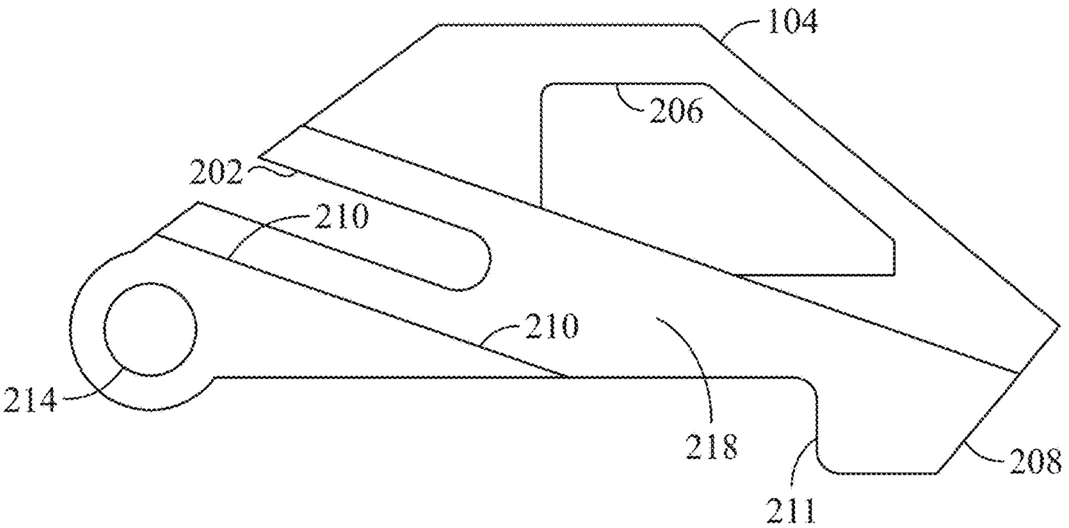
FIG. 2 illustrates a side view of a body of a locking apparatus, according to some embodiments.

FIG. 2 illustrates a first side view of a main body 104 (also depicted as 104 in FIG. 1) of a locking apparatus. The main body 104 may define a mounting hole 214, a pin guide 206, a slide guide 202, and a slide track 210 which interfaces 216 with the slide 102. The main body may further define a slide channel 218 in which the slide 102 may be seated. The main body 104 may further include a lift nose 208 configured to rotate the locking apparatus when in use.

Figure 3:
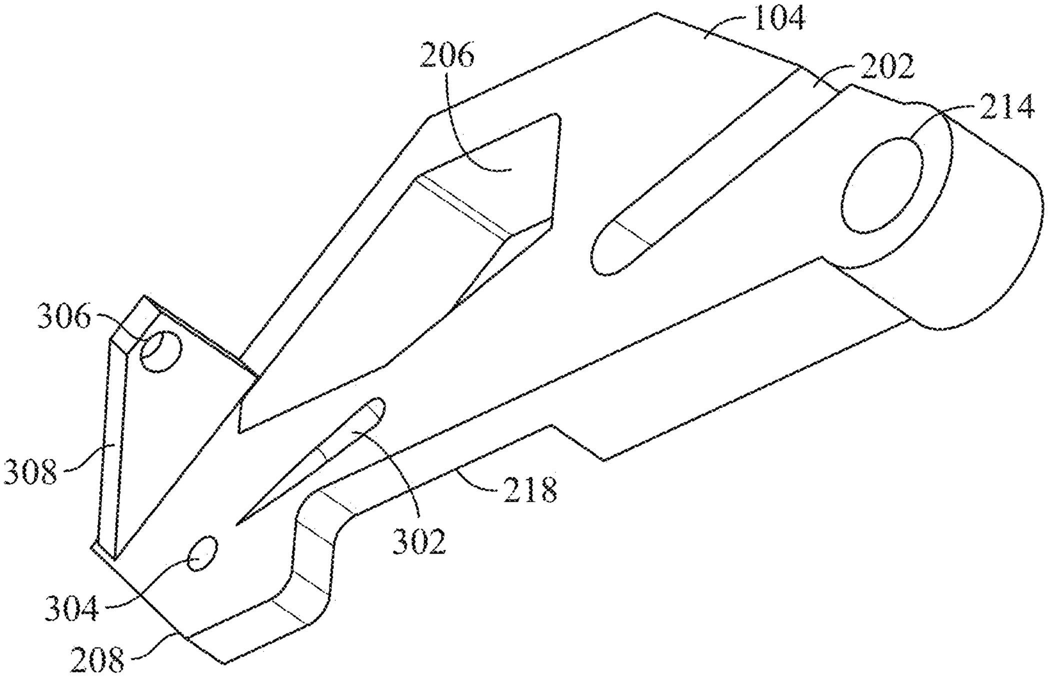
FIG. 3 illustrates a perspective view of a body of a locking apparatus, according to some embodiments.
Figure 4:
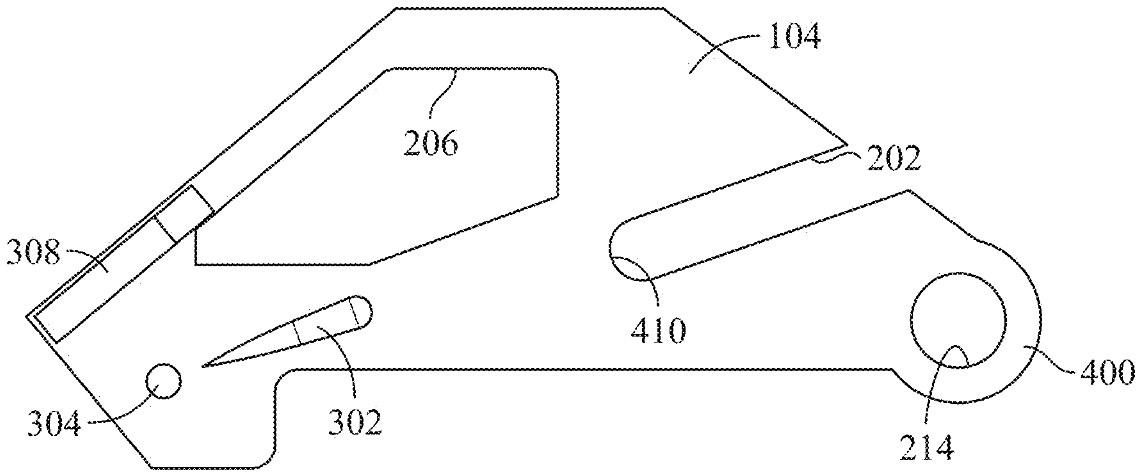
FIG. 4 illustrates a side view of the body of a locking apparatus, according to some embodiments.

FIGS. 3 and 4 illustrate a perspective view and a side view of a main body 104 (also depicted as 104 in FIG. 1 and FIG. 2) of a locking apparatus. The main body 104 may define a mounting hole 214, a pin guide 206, and a slide guide 202. The main body may further define a slide channel 218 in which the slide 102 (seen in FIG. 1) may be slidably seated. The main body 104 may further include a lift nose 208 configured to rotate the locking apparatus when in use. The main body may further include a first spring mount 308 defining a first spring mounting hole 306 to receive the resistance spring (depicted as 106 in FIG. 1). The main body 104 may define a grub screw guide groove 302 constructed and arranged to lift, guide, and secure, in conjunction with the resistance spring, the grub screw into a concave divot 304 also defined by the main body 104. The grub screw guide groove 302 and concave divot 304 may be constructed and arranged to create resistance for the slide 102 during an attempted breach of the locking apparatus as the grub screw travels from the grub screw guide groove 302 and into the concave divot 304, forced by the resistance spring. The grub screw guide groove 302 may be generally tapered in width and depth, or otherwise generally tear-drop shaped in depth and perimeter.

Figure 5:
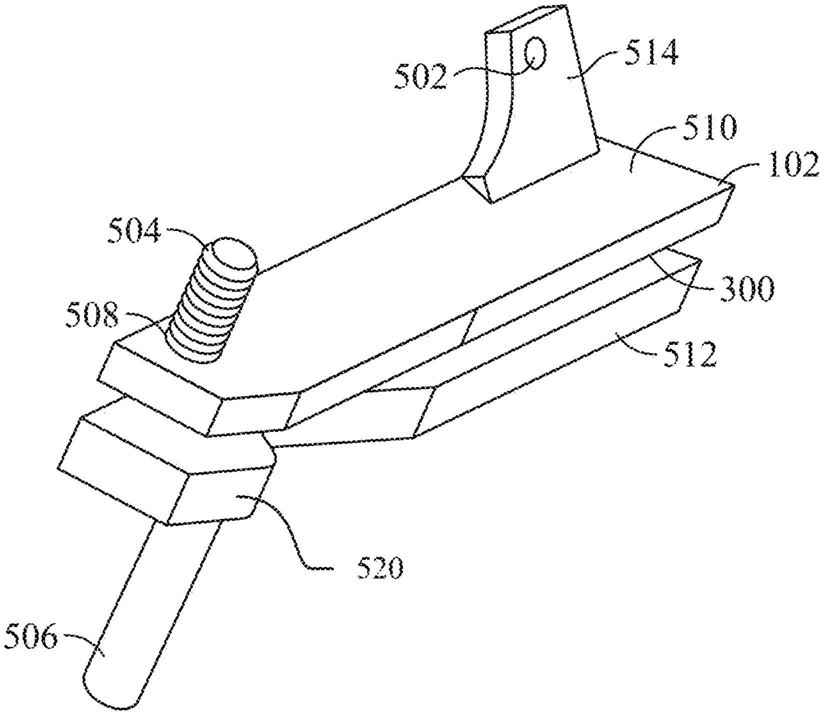
FIG. 5 illustrates a perspective view of the slide of a locking apparatus, according to some embodiments.
Figure 6:
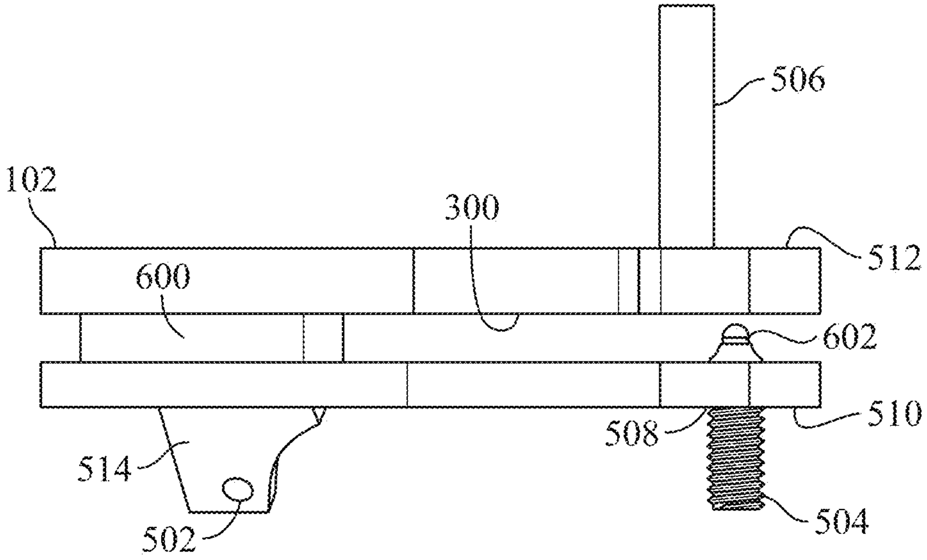
FIG. 6 illustrates a bottom view of the slide of the locking apparatus, according to some embodiments.

FIGS. 5 and 6 illustrate a perspective view and side view of the slide 102 of a locking apparatus, according to some embodiments. The slide 102 may include a first plate 510 and a second plate 512 joined by a rail (depicted as 600 in FIG. 6) which may slidably interact with slide guide 202, seen in FIG. 2. The first plate 510 and second plate 512 may slidably travel within the slide channel 218 (best seen in FIG. 2). The first plate 510 and second plate 512 may also jointly form the lift nose 520. which engages with a secure during use, and which is explained in detail in the description of FIGS. 15-19. The slide 102 and the first plate 510 and second plate 512 may also define a body channel 300 configured to slidably engage with the main body (depicted as 104 in FIGS. 1 and 2). The slide 102 may define a grub screw hole 508 into which a grub screw 504 may be threaded, such that the grub screw tip 602 may interface with the grub screw guide groove 302 and into the concave divot 304 (depicted in FIG. 3). The slide 102 may further include a second spring mount 514 defining a second spring mounting hole 502 to receive the resistance spring (depicted as 106 in FIG. 1). The slide 102 may further include a security pin 506 mounted to the second plate 512. The security pin 506 may be constructed and arranged to mechanically engage with the locking mechanism of a door.

Figure 7:
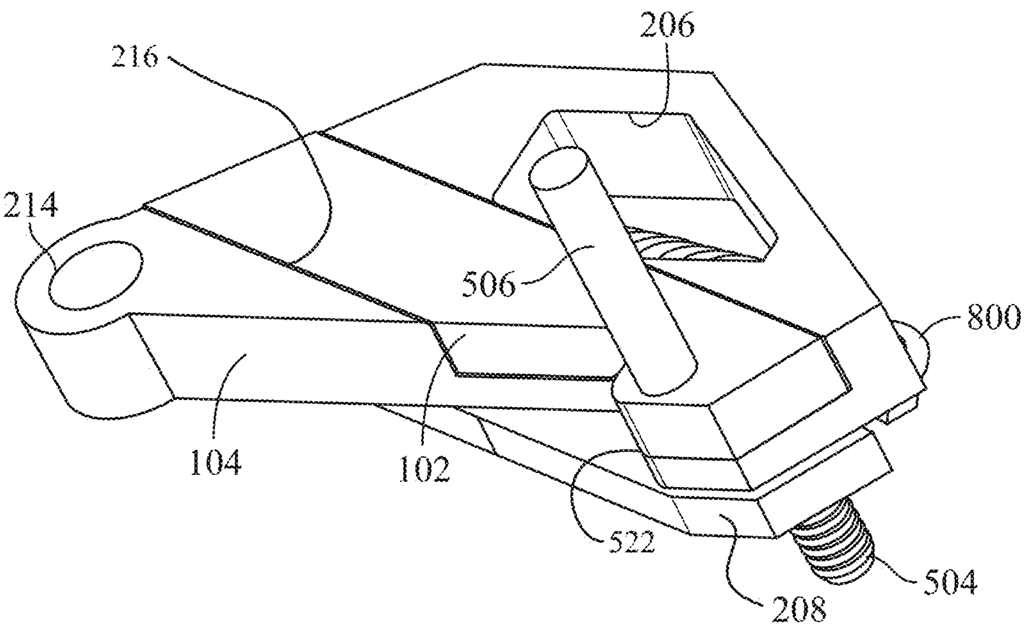
FIG. 7 illustrates an assembled perspective view of a locking apparatus, according to some embodiments.
Figure 8:
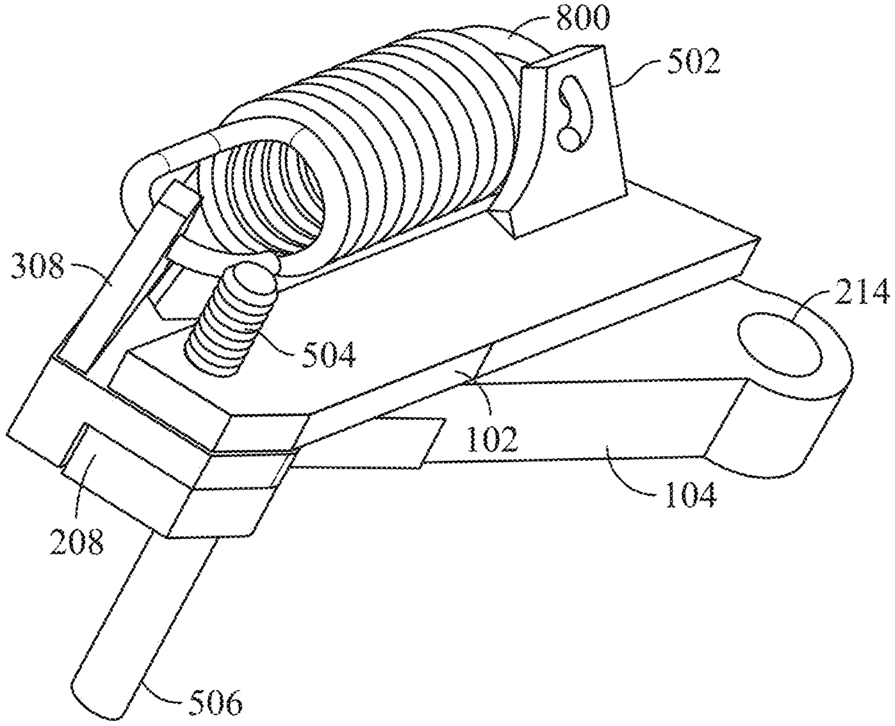
FIG. 8 illustrates an assembled perspective view of a locking apparatus, according to some embodiments.
Figure 9:
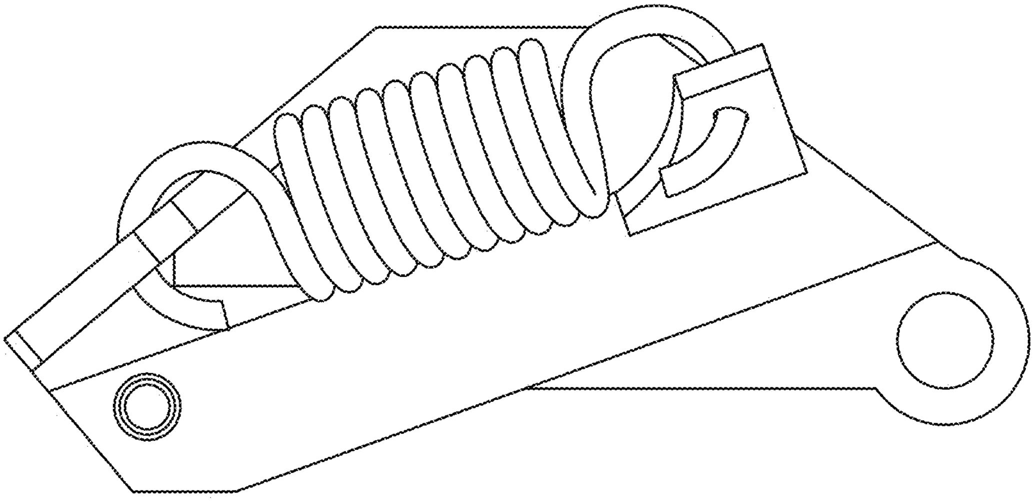
FIG. 9 illustrates an assembled side view of a locking apparatus, according to some embodiments.
Figure 10:
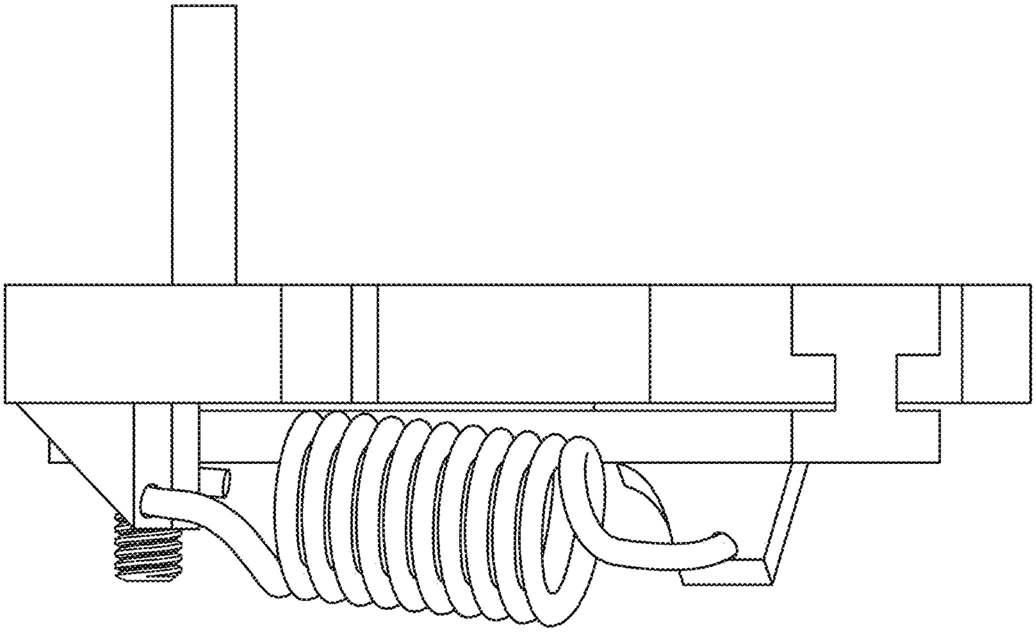
FIG. 10 illustrates an assembled top view of a locking apparatus, according to some embodiments.
Figure 11:
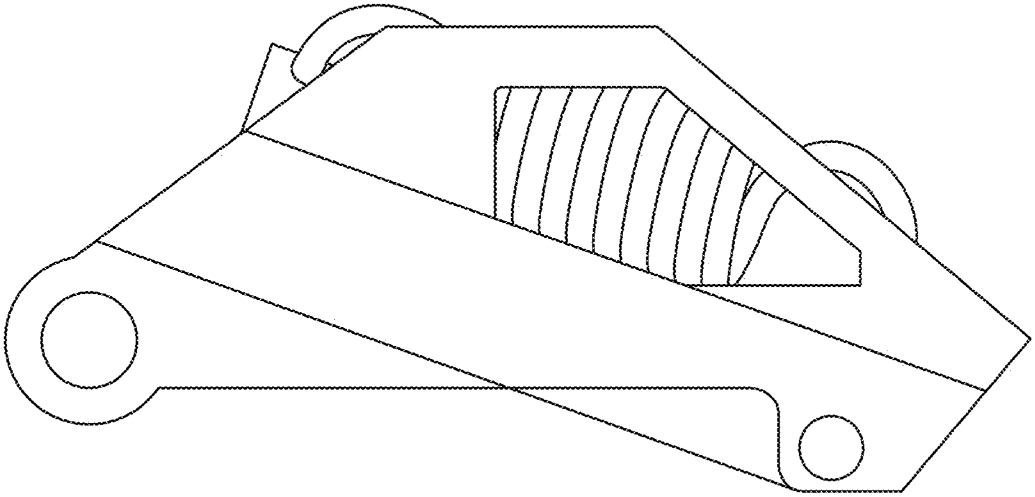
FIG. 11 illustrates an assembled side view of a locking apparatus, according to some embodiments.
Figure 12:
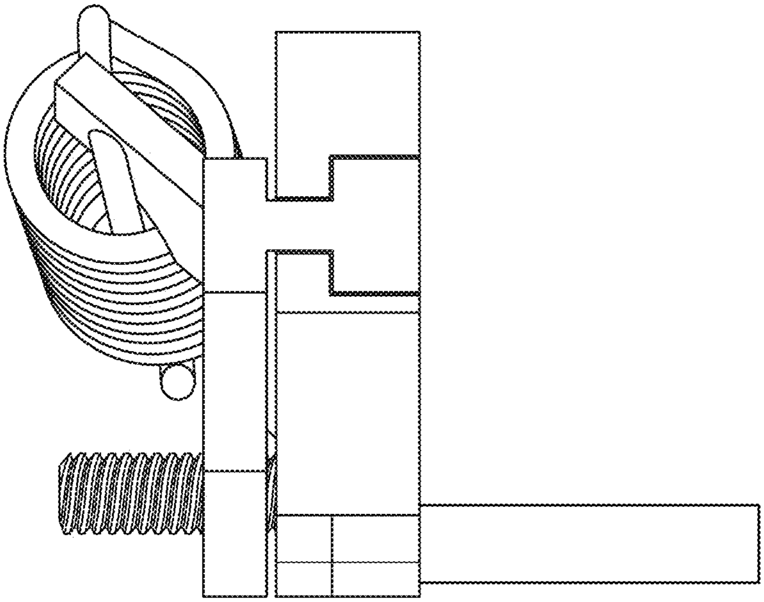
FIG. 12 illustrates an assembled rear view of a locking apparatus, according to some embodiments.
Figure 13:
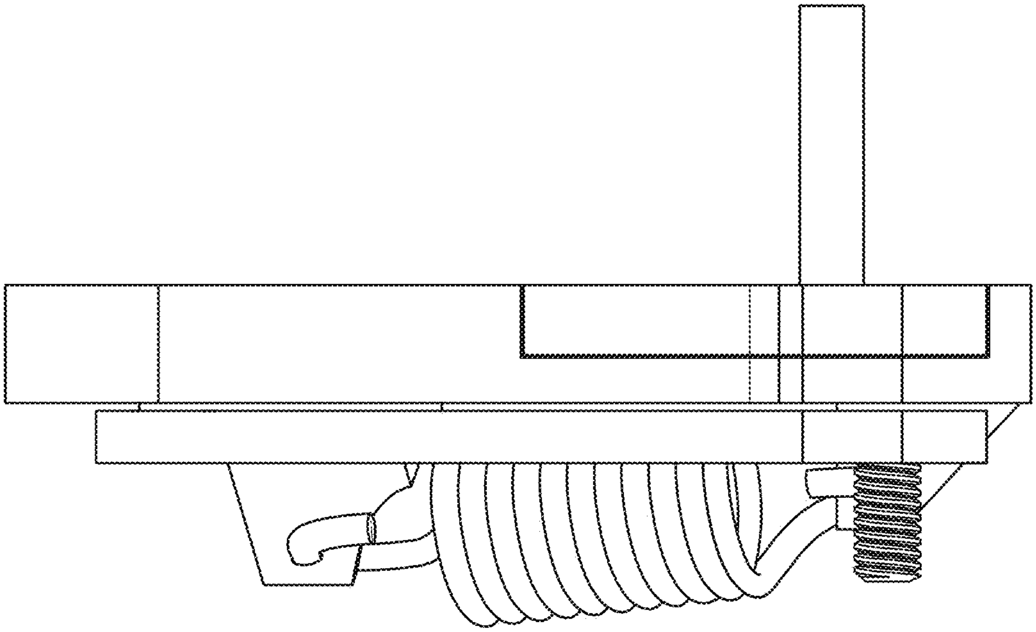
FIG. 13 illustrates an assembled bottom view of a locking apparatus, according to some embodiments.
Figure 14:
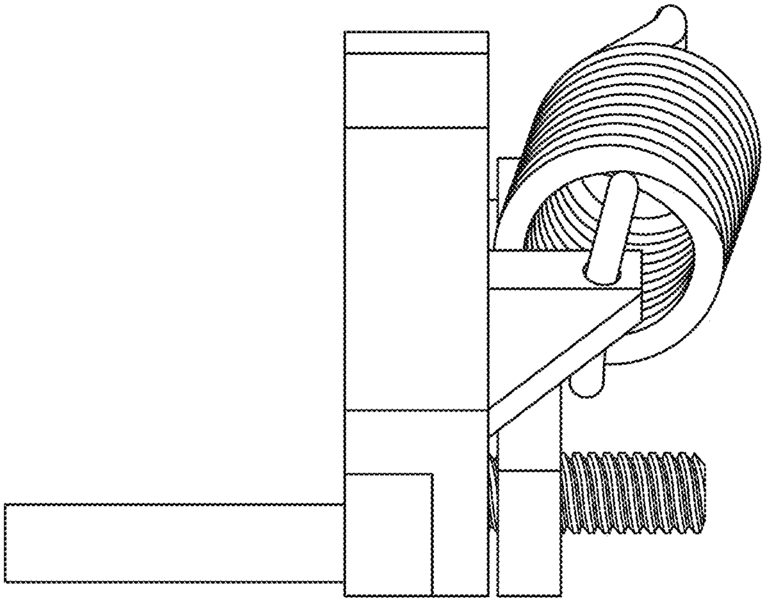
FIG. 14 illustrates an assembled front view of a locking apparatus, according to some embodiments.

FIGS. 7 and 8 illustrate assembled perspective views of a locking apparatus, according to some embodiments. Slide 102 may be slidably engaged with the main body 104 and biased into a closed position via spring 800. In the same way, the grub screw 504 may be biased into the concave divot (not shown) defined by the main body 104. The spring 800 may be attached to the slide 102 at the first spring mount 308 defining a first spring mounting hole 306 and the second spring mount 514 defining a second spring mounting hole 502. The locking apparatus may be mounted to a fixture or surface adjacent a secure door via the mounting hole 214. The slide 102 may further include a security pin 506 mounted to the second plate 512. The security pin 506 may be constructed and arranged to mechanically engage with the locking mechanism of a door. The lift nose 208 may be constructed and arranged to rotate the entire locking apparatus around an axis of rotation at the mounting hole 214 such that the security pin 506 may travel within a larger door locking assembly, depicted in FIGS. 15 through 19. The slide 102 and main body 104 may also form a shoulder 522 constructed and arranged to engage with a latch lever of a larger door locking assembly depicted in FIGS. 15 through 19.

FIGS. 9 through 14 illustrate various views of the locking apparatus.

Figure 15:
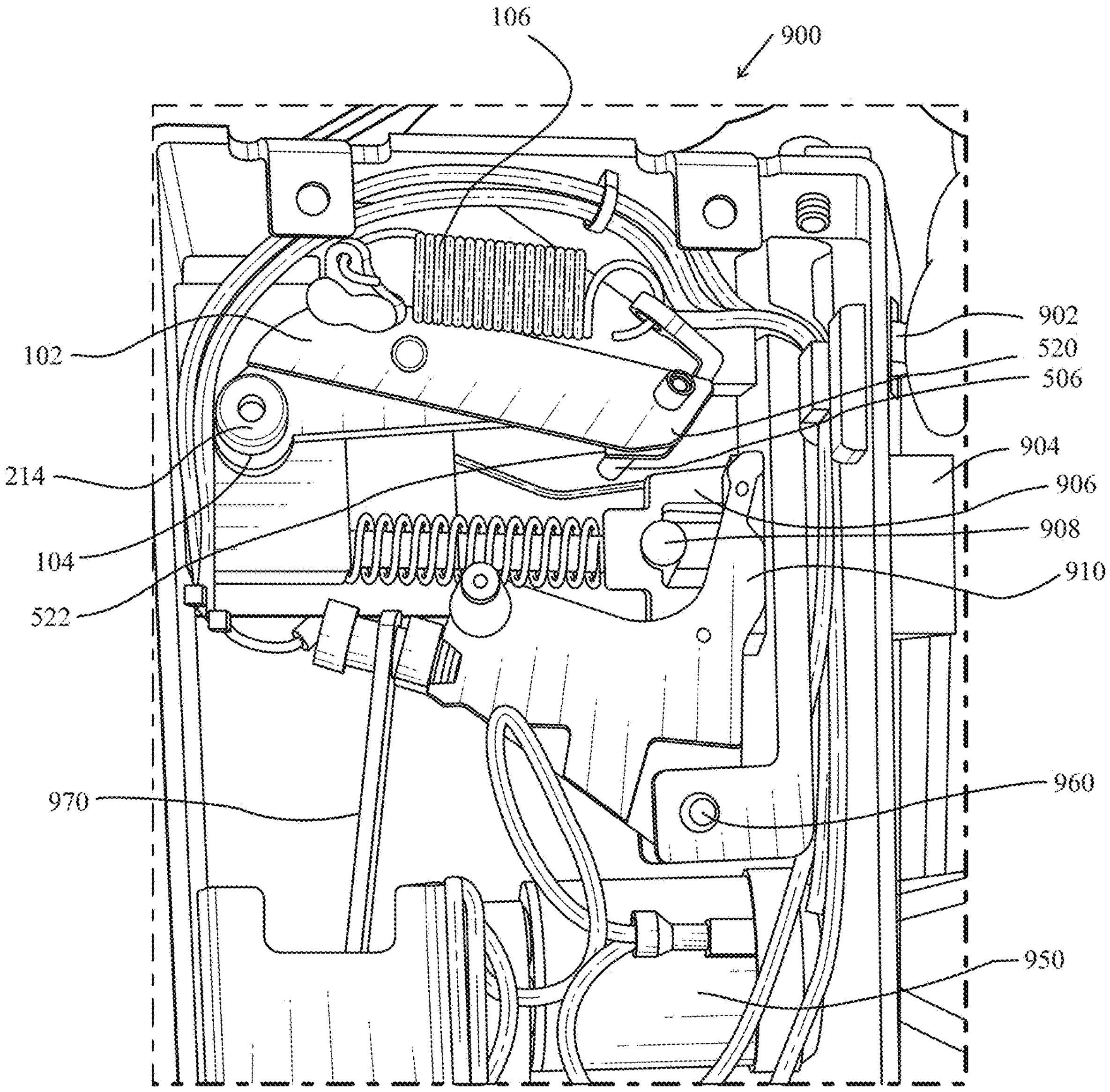
FIG. 15 illustrates an exposed view of a locking apparatus implemented in a secure door mechanism, as viewed from the rear of the secure door mechanism according to some embodiments.
Figure 16:
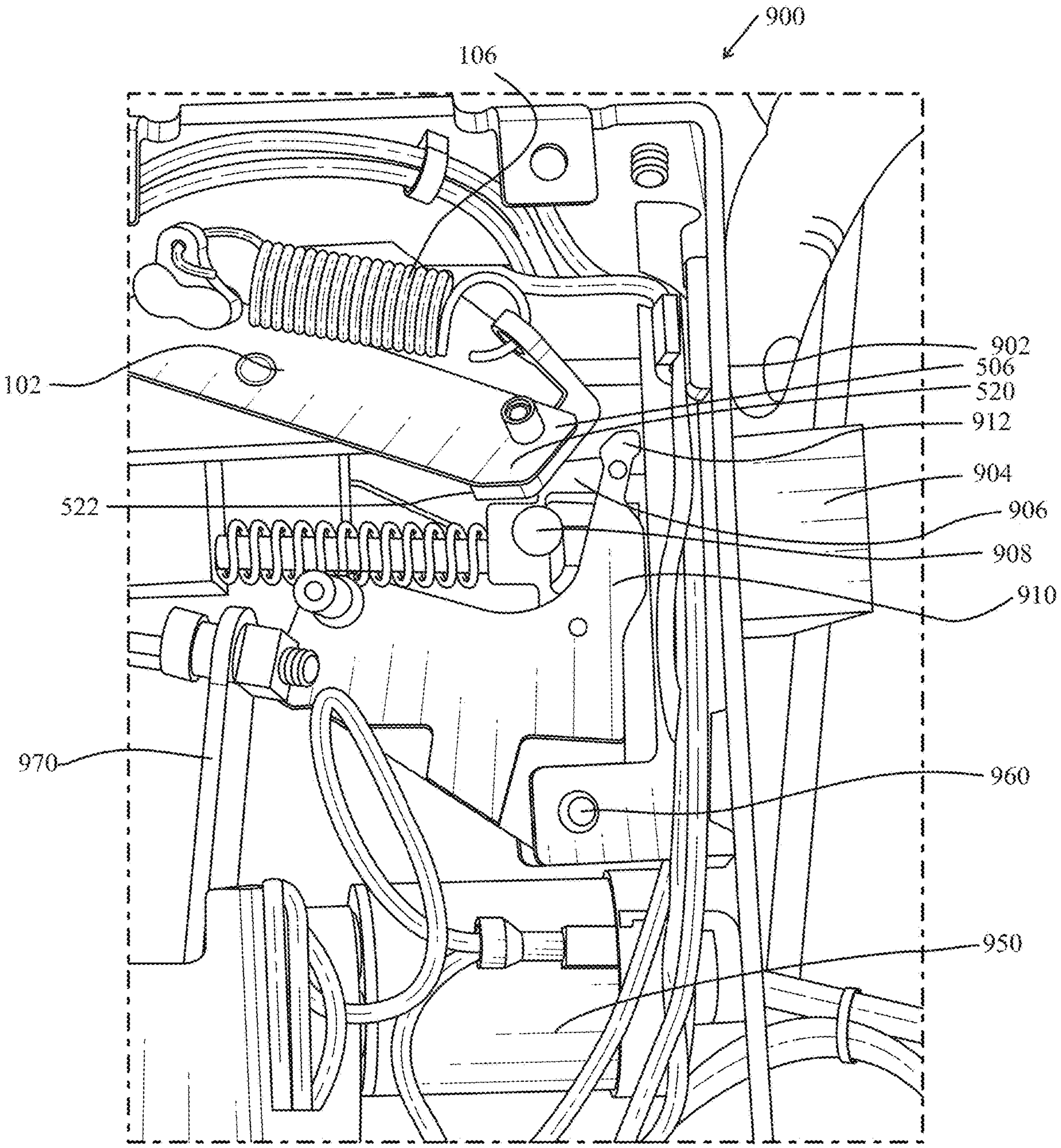
FIG. 16 illustrates an exposed view of a locking apparatus implemented in a secure door mechanism, as viewed from the rear of the secure door mechanism according to some embodiments.
Figure 17:
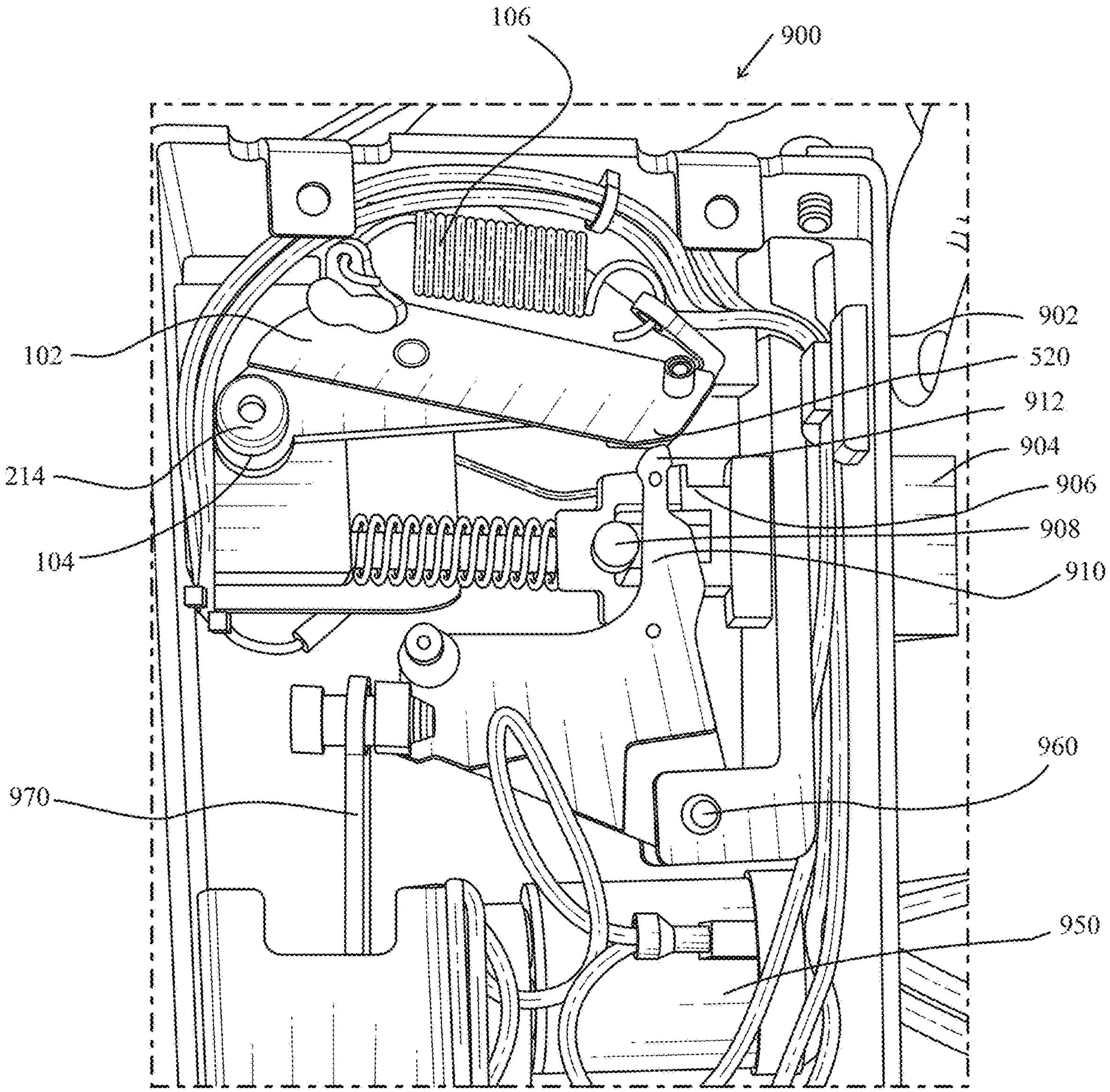
FIG. 17 illustrates an exposed view of a locking apparatus implemented in a secure door mechanism, as viewed from the rear of the secure door mechanism according to some embodiments.
Figure 18:
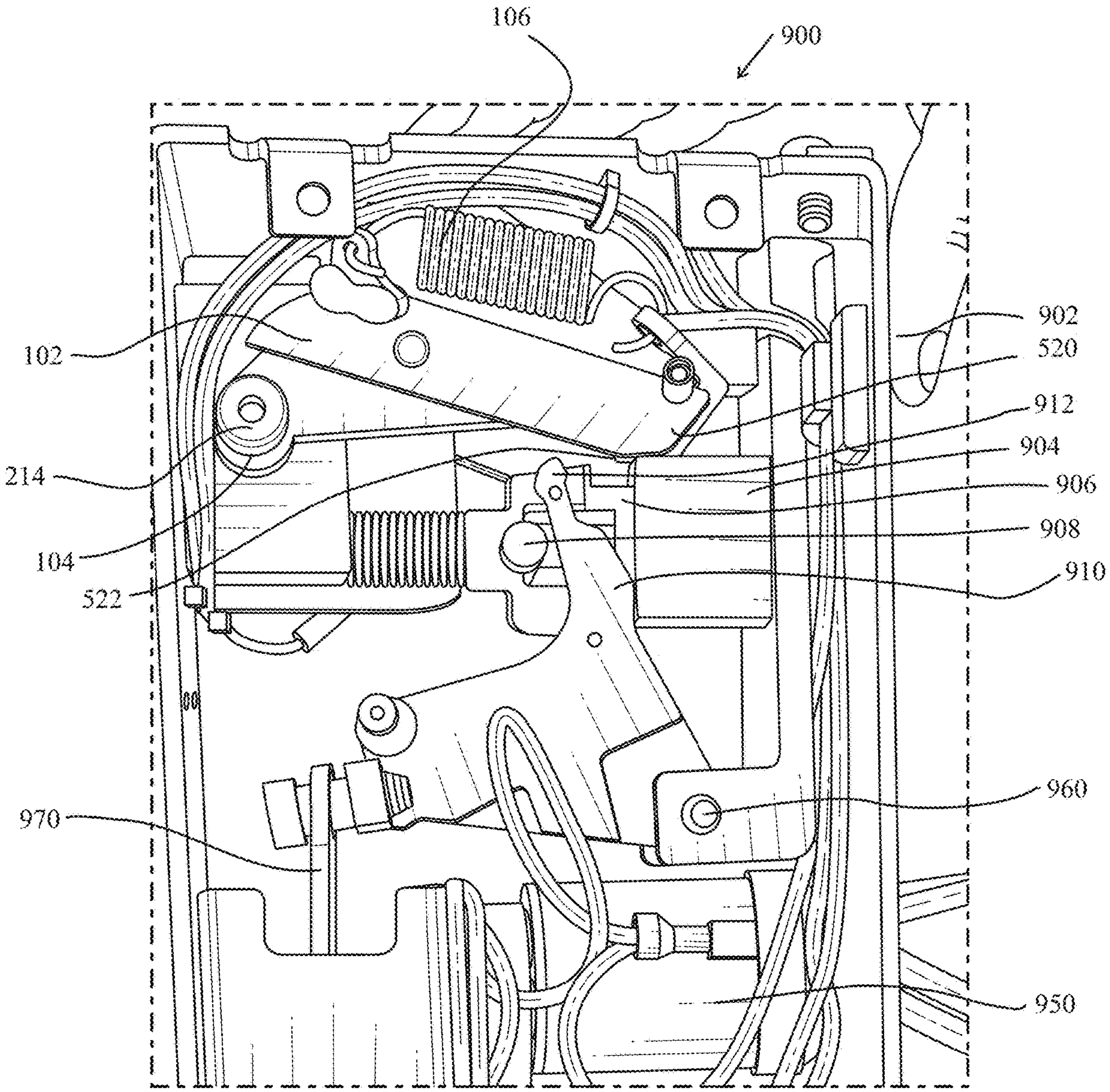
FIG. 18 illustrates an exposed view of a locking apparatus implemented in a secure door mechanism, as viewed from the rear of the secure door mechanism according to some embodiments.
Figure 19:
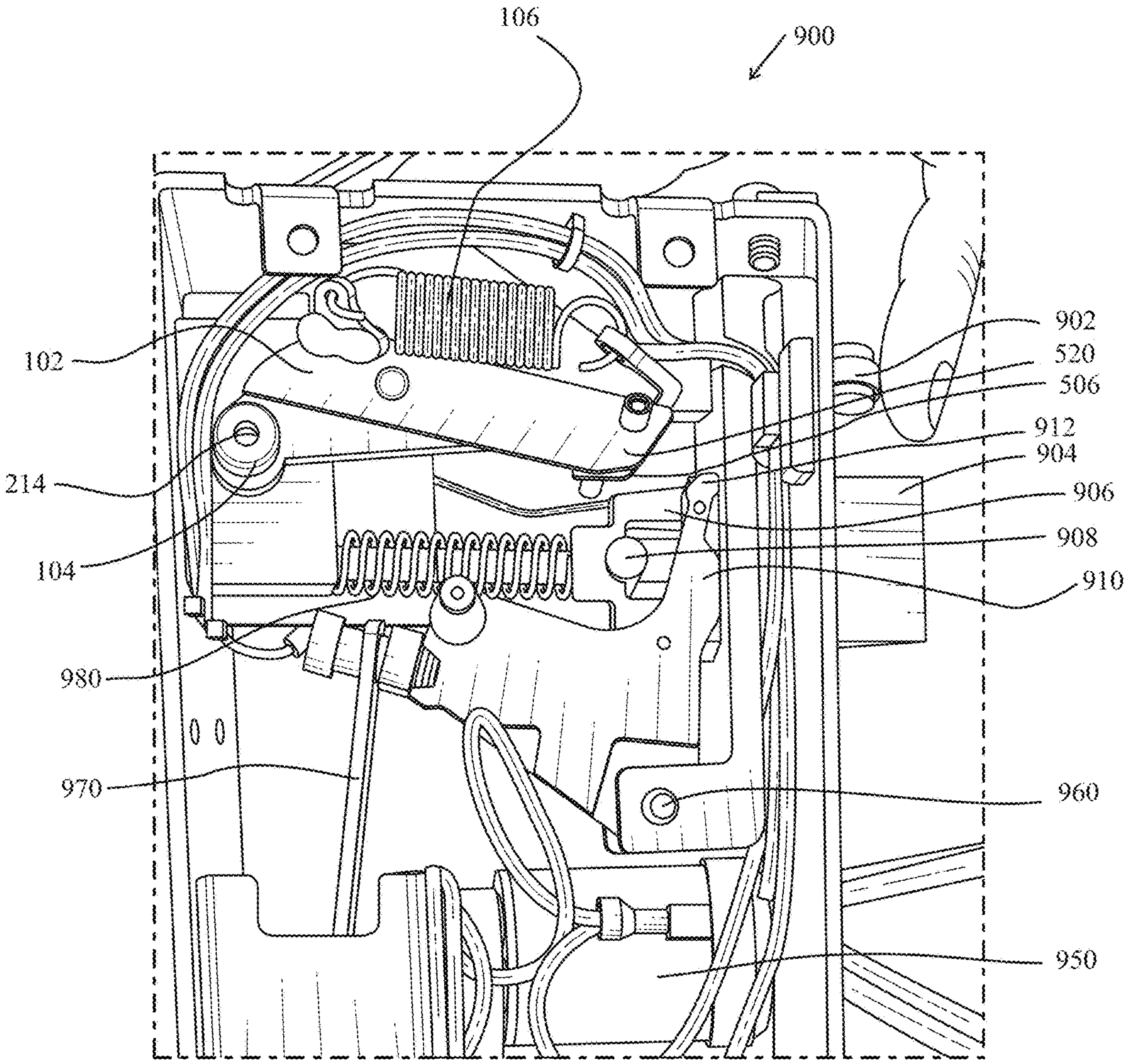
FIG. 19 illustrates an exposed view of a locking apparatus implemented in a secure door mechanism, as viewed from the rear of the secure door mechanism according to some embodiments.

FIGS. 15-19 illustrate an exposed view of a locking apparatus implemented in a secure door mechanism, as viewed from the rear of the secure door mechanism during operation of the secure door mechanism and locking apparatus. FIG. 15 shows the secure door mechanism and locking apparatus in a "closed door" position. FIGS. 16-18 show secure door mechanism and locking apparatus during the transition from a "closed door" position to an "open door" position. FIG. 19 shows the secure door mechanism and locking apparatus in an "open door" position.

Referring to FIG. 15, the locking apparatus is depicted installed in a secure door mechanism 900 configured to lock or unlock doors, such as penitentiary doors. The locking apparatus includes a main body 104 defining mounting hole 214 to mount the locking apparatus to the secure door mechanism. A resistance spring 106 may attach to both the main body 104 and the slide 102 such that the slide and main body may be biased towards one another. The slide 102 may include a lift nose 520 constructed and arranged to engage with a latch lever 910, and in particular, a latch lever nose 912 during operation. The slide 102 may include a security pin 506 constructed and arranged to engage with the latch arm 906 which is attached to the door latch 904 and latch arm in 908. In a "closed door" position as in FIG. 15, the roller trigger 902 of the secure door mechanism 900 is biased into the secure door mechanism 900 and engages the pin guide (depicted at least in FIGS. 2-4) of the main body 104 such that the lift nose 520 is biased downward, toward the latch lever 910, but does engage the latch lever nose 112. A secure door mechanism motor 950 may be constructed and arranged to drive movement of the latch lever 910 and latch lever nose 912 when transitioning from open to closed, or vice versa, by driving the drive arm 970 to pivot the latch lever 910 around pivot 960.

Referring to FIG. 16, the locking apparatus is depicted installed in a secure door mechanism in a closed, secure position. During operation, particularly during unlocking of the secure door mechanism 900, the roller trigger 902 may be fully biased towards the locking apparatus, driving the lift nose 520 downward towards the latch arm 906 and latch arm pin 908 by engaging with the pin guide (depicted at least in FIGS. 2-4) of the main body 104.

Referring to FIG. 17, the locking apparatus is depicted installed in a secure door mechanism during unlocking. During operation, particularly during unlocking of the secure door mechanism 900, the secure door mechanism motor 950 may drive the latch lever 910 generally towards the locking apparatus. Upon unlocking, such as via electronic button in operable communication with the secure door mechanism motor 950. By unlocking, the secure door mechanism motor 950 may drive the drive arm 970 to pivot the latch lever 910 around pivot 960 such that the latch lever nose 912 engages with the lift nose 520 and driving the locking apparatus generally upwards. The latch 904 is also pulled into an open position along with the latch arm 906.

Referring to FIG. 18, the locking apparatus is depicted installed in a secure door mechanism during unlocking. In a fully unlocked, open position, the latch lever nose 912 has passed under, and behind, the lift nose 520 and has engaged with the shoulder 522, effectively securing the latch 904 within the secure door mechanism while the roller trigger 902 is fully biased towards the locking apparatus. The locking and apparatus and secure door mechanism are in a "charged" but unlocked state.

Referring to FIG. 19, the locking apparatus is depicted installed in a secure door mechanism when triggering re-locking of the secure door mechanism upon release of the roller trigger 902. When released, the roller trigger 902 may force the locking apparatus upward by engaging the pin guide (depicted at least in FIGS. 2-4) of the main body 104 such that the lift nose 520 is biased upward and the latch lever nose 912 is no longer engaged with the shoulder 522. In the way, the latch lever 910, latch lever nose 912, latch 904, latch arm 906, and latch arm pin 908 may all spring back to their locked positions via spring 980, as shown in FIGS. 15 and 19. The locked positions depicted in FIGS. 15 and 19 may be a representation of when the door is both closed and locked, or when the door is open but also in a locked, latch-exposed position.

The resistance spring may be constructed and arranged to prevent the failure of shear pins or security pins (depicted as 506 in FIG. 5) during a breach attempt of a secure lock or door system. In the event that a shear pin is broken, the latch lever 910, latch lever nose 912, latch 904, and latch arm 906 are able to travel freely within the lock assembly, resulting in an unsecure door lock. According to the present embodiments, the security pin 506 acts as a security trigger, rests behind the latch arm 906, and holds the latch opening during opening of a door. During an attempted breach, the resistance spring and locking apparatus allows the security pin to slide upward and back relative to the latch arm rather than shear and subsequently trip forward relative to the latch arm, effectively resetting the lock during a breach attempt.

The following description of variants is only illustrative of components, elements, acts, product, and methods considered to be within the scope of the disclosure and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a retrofittable, auto-resetting detention locking apparatus may include a main body defining a mounting hole, a pin guide, a slide guide, a slide track, a slide channel, a grub screw guide groove, and a concave divot; a first spring mount affixed to the main body and defining a first spring mounting hole; a slide including a first plate and a second plate joined by a rail constructed and arranged to slidably interact with slide guide and slidably travel within the slide channel and wherein the slide defines a grub screw guide groove and a concave divot; a second spring mount affixed to the slide and defining a second spring mounting hole; a resistance spring mounted to the first spring mounting hole and the second spring mounting hole; and a security pin fixed to the second plate.

Variation 2 may include a retrofittable, auto-resetting detention locking apparatus as in variation 1, wherein the main body includes a lift nose configured to rotate the locking apparatus when in use.

Variation 3 may include a retrofittable, auto-resetting detention locking apparatus as in variation 1 or 2, further including a grub screw threadingly attached to the slide.

Variation 4 may include a retrofittable, auto-resetting detention locking apparatus as in any of variations 1 through 3, wherein the resistance spring is constructed and arranged to create resistance for the slide 1 during an attempted breach of the locking apparatus as a grub screw travels from the grub screw guide groove and into the concave divot.

Variation 5 may include a retrofittable, auto-resetting detention locking apparatus as in any of variations 1 through 4, wherein the grub screw guide groove is generally tapered in width and depth.

Variation 6 may include a retrofittable, auto-resetting detention locking apparatus as in any of variations 1 through 5, wherein the grub screw guide groove is generally tear-drop shaped in depth and perimeter.

Variation 7 may include a retrofittable, auto-resetting detention locking apparatus as in any of variations 1 through 6, wherein the security pin is constructed and arranged to mechanically engage with the locking mechanism of a door.

Variation 8 may include a retrofittable, auto-resetting detention locking apparatus as in any of variations 1 through 7, wherein the pin guide is constructed and arranged to prevent locking of a roller arm into an open position.

Variation 9 may include a retrofittable, auto-resetting detention locking apparatus as in any of variations 1 through 8, wherein the main body and slide include metal.

Variation 10 may include a retrofittable, auto-resetting detention locking apparatus as in any of variations 1 through 9, wherein the main body and slide include steel.

Variation 11 may include a retrofittable, auto-resetting detention locking apparatus as in any of variations 1 through 10, wherein the resistance spring is constructed and arranged to automatically reset the retrofittable, auto-resetting detention locking apparatus.

According to variation 12, a retrofittable, auto-resetting detention locking apparatus may include a metal main body defining a mounting hole, a pin guide, a slide guide, a slide track, a slide channel, a grub screw guide groove, and a concave divot; a first spring mount affixed to the main body and defining a first spring mounting hole; a metal slide including a first plate and a second plate joined by a rail constructed and arranged to slidably interact with slide guide and slidably travel within the slide channel and wherein the slide defines a grub screw guide groove and a concave divot; a second spring mount affixed to the slide and defining a second spring mounting hole; a resistance spring mounted to the first spring mounting hole and the second spring mounting hole; a grub screw threadingly attached to the slide; and a security pin fixed to the second plate, the security pin being constructed and arranged to mechanically engage with the locking mechanism of a door.

Variation 13 may include a retrofittable, auto-resetting detention locking apparatus as in variation 12, wherein the main body includes a lift nose configured to rotate the locking apparatus when in use.

Variation 14 may include a retrofittable, auto-resetting detention locking apparatus as in variation 12 or 13, wherein the resistance spring is constructed and arranged to create resistance for the slide during an attempted breach of the locking apparatus as the grub screw travels from the grub screw guide groove and into the concave divot.

Variation 15 may include a retrofittable, auto-resetting detention locking apparatus as in any of variations 12 through 14, wherein the grub screw guide groove is generally tapered in width and depth.

Variation 16 may include a retrofittable, auto-resetting detention locking apparatus as in any of variations 12 through 15, wherein the grub screw guide groove is generally tear-drop shaped in depth and perimeter.

Variation 17 may include a retrofittable, auto-resetting detention locking apparatus as in any of variations 12 through 16, wherein the pin guide is constructed and arranged to prevent locking of a roller arm into an open position.

Variation 18 may include a retrofittable, auto-resetting detention locking apparatus as in any of variations 12 through 17, wherein the resistance spring is constructed and arranged to automatically reset the retrofittable, auto-resetting detention locking apparatus.

Variation 19 may include a retrofittable, auto-resetting detention locking apparatus as in any of variations 12 through 18, wherein the main body and slide include steel.

According to variation 20, a retrofittable, auto-resetting detention locking apparatus may include a steel main body defining a mounting hole, a pin guide, a slide guide, a slide track, a slide channel, a grub screw guide groove, and a concave divot; a first spring mount affixed to the main body and defining a first spring mounting hole; a steel slide including a first plate and a second plate joined by a rail constructed and arranged to slidably interact with slide guide and slidably travel within the slide channel and wherein the slide defines a grub screw guide groove and a concave divot; a second spring mount affixed to the slide and defining a second spring mounting hole; a resistance spring mounted to the first spring mounting hole and the second spring mounting hole, the spring being constructed and arranged to automatically reset the retrofittable, auto-resetting detention locking apparatus and to create resistance for the slide during an attempted breach of the locking apparatus as the grub screw travels from the grub screw guide groove and into the concave divot; and a grub screw threadingly attached to the slide; and a security pin fixed to the second plate, the security pin being constructed and arranged to mechanically engage with the locking mechanism of a door.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A retrofittable, auto-resetting detention locking apparatus, comprising:

a main body defining a mounting hole, a pin guide, a slide guide, a slide track, a slide channel, a grub screw guide groove, and a concave divot;

a first spring mount affixed to the main body and defining a first spring mounting hole;

a slide comprising a first plate and a second plate joined by a rail constructed and arranged to slidably interact with the slide guide and slidably travel within the slide channel and wherein the slide defines a grub screw hole;

a second spring mount affixed to the slide and defining a second spring mounting hole;

a resistance spring mounted to the first spring mounting hole and the second spring mounting hole; and a security pin fixed to the second plate; and wherein the main body comprises a lift nose configured to rotate the locking apparatus when in use.

2. A retrofittable, auto-resetting detention locking apparatus as in claim 1, further comprising a grub screw threadingly attached to the slide.

3. A retrofittable, auto-resetting detention locking apparatus as in claim 1, wherein the resistance spring is constructed and arranged to create resistance for the slide during an attempted breach of the locking apparatus as a grub screw travels from the grub screw guide groove and into the concave divot.

4. A retrofittable, auto-resetting detention locking apparatus as in claim 1, wherein the grub screw guide groove is generally tapered in width and depth.

5. A retrofittable, auto-resetting detention locking apparatus as in claim 1, wherein the grub screw guide groove is generally tear-drop shaped in depth and perimeter.

6. A retrofittable, auto-resetting detention locking apparatus as in claim 1, wherein the security pin is constructed and arranged to mechanically engage with a locking mechanism of a door.

7. A retrofittable, auto-resetting detention locking apparatus as in claim 1, wherein the pin guide is constructed and arranged to prevent locking of a roller arm into an open position.

8. A retrofittable, auto-resetting detention locking apparatus, comprising:

a metal main body defining a mounting hole, a pin guide, a slide guide, a slide track, a slide channel, a grub screw guide groove, and a concave divot;

a first spring mount affixed to the main body and defining a first spring mounting hole;

a metal slide comprising a first plate and a second plate joined by a rail constructed and arranged to slidably interact with slide guide and slidably travel within the slide channel and wherein the slide defines a grub screw hole;

a second spring mount affixed to the slide and defining a second spring mounting hole;

a resistance spring mounted to the first spring mounting hole and the second spring mounting hole; a grub screw threadingly attached to the slide; and a security pin fixed to the second plate, the security pin being constructed and arranged to mechanically engage with a locking mechanism of a door.

9. A retrofittable, auto-resetting detention locking apparatus as in claim 8, wherein the main body comprises a lift nose configured to rotate the locking apparatus when in use.

10. A retrofittable, auto-resetting detention locking apparatus as in claim 8, wherein the resistance spring is constructed and arranged to create resistance for the slide during an attempted breach of the locking apparatus as the grub screw travels from the grub screw guide groove and into the concave divot.

11. A retrofittable, auto-resetting detention locking apparatus as in claim 8, wherein the grub screw guide groove is generally tapered in width and depth.

12. A retrofittable, auto-resetting detention locking apparatus as in claim 8, wherein the grub screw guide groove is generally tear-drop shaped in depth and perimeter.

13. A retrofittable, auto-resetting detention locking apparatus as in claim 8, wherein the pin guide is constructed and arranged to prevent locking of a roller arm into an open position.

14. A retrofittable, auto-resetting detention locking apparatus as in claim 8, wherein the resistance spring is constructed and arranged to automatically reset the retrofittable, auto-resetting detention locking apparatus.

15. A retrofittable, auto-resetting detention locking apparatus as in claim 8, wherein the main body and slide comprise steel.

16. A retrofittable, auto-resetting detention locking apparatus, comprising:

a steel main body defining a mounting hole, a pin guide, a slide guide, a slide track, a slide channel, a grub screw guide groove, and a concave divot;

a first spring mount affixed to the main body and defining a first spring mounting hole;

a steel slide comprising a first plate and a second plate joined by a rail constructed and arranged to slidably interact with the slide guide and slidably travel within the slide channel and wherein the slide defines a grub screw hole;

a second spring mount affixed to the slide and defining a second spring mounting hole;

a resistance spring mounted to the first spring mounting hole and the second spring mounting hole, the spring being constructed and arranged to automatically reset the retrofittable, auto-resetting detention locking apparatus and to create resistance for the slide during an attempted breach of the locking apparatus as a grub screw travels from a grub screw guide groove and into the concave divot;

the grub screw threadingly attached to the slide; and a security pin fixed to the second plate, the security pin being constructed and arranged to mechanically engage with a locking mechanism of a door.

* * * * *